United States Patent [19]

Batchelor

[11] 4,245,322

[45] Jan. 13, 1981

[54] TRANSDUCER CIRCUIT FOR USE IN THE MEASUREMENT OF THE ROTARY SPEED OF A SHAFT OR OTHER ROTARY MEMBER

[75] Inventor: Richard W. Batchelor, Solihull, England

[73] Assignee: Lucas Industries Limited, Birmingham, England

[21] Appl. No.: 23,279

[22] Filed: Mar. 23, 1979

[30] Foreign Application Priority Data

Apr. 13, 1978 [GB] United Kingdom ............... 14507/78

[51] Int. Cl.³ .................................................. G01P 3/44
[52] U.S. Cl. ................................... 364/565; 364/569; 235/92 FQ; 235/92 TF; 324/163
[58] Field of Search .............................. 364/565, 569; 235/92 FQ, 92 TF, 92 T; 324/163, 166

[56] References Cited

U.S. PATENT DOCUMENTS

| | | | |
|---|---|---|---|
| 3,748,533 | 7/1973 | South | 324/166 |
| 3,962,567 | 6/1976 | Oicles et al. | 235/92 FQ |
| 4,000,465 | 12/1976 | Sugiyama | 235/92 FQ |
| 4,050,747 | 9/1977 | Ruhnau et al. | 364/565 |
| 4,083,052 | 4/1978 | Metcalf | 235/92 FQ |
| 4,125,295 | 11/1978 | Ruhnau et al. | 364/565 |
| 4,152,645 | 5/1979 | Bendler | 364/565 |

OTHER PUBLICATIONS

IBM Technical Disclosure Bulletin-"Computer and Apparatus for Measuring Rotational Speed" by Bederman, vol. 13, No. 4, Sep., 1970 pp. 1017-1018.

*Primary Examiner*—Charles E. Atkinson
*Assistant Examiner*—Gary Chin
*Attorney, Agent, or Firm*—Holman & Stern

[57] ABSTRACT

A transducer circuit includes a transducer device connected to be driven by a rotary member the speed of which it is required to measure. The transducer device produces output pulses at specific angular positions which are counted by an n-bit counter and which are also used to clock an m-bit latch circuit. Pulses from a clock pulse generator are counted by an m-bit counter, which has its data outputs connected to the data inputs of the latch circuit. An output register is connected to the n-bit counter and the latch circuit to receive an n+m bit code therefrom each time the m-bit counter produces a carry out pulse. Thus the n+m code in the output register contains data relating to the number of pulses produced by the transducer device in the fixed interval between carry out pulses and data relating to the number of pulses produced by the clock between the start of that interval and the instant when the last transducer device pulse was produced. This data can be processed to provide an accurate m-bit speed code.

1 Claim, 1 Drawing Figure

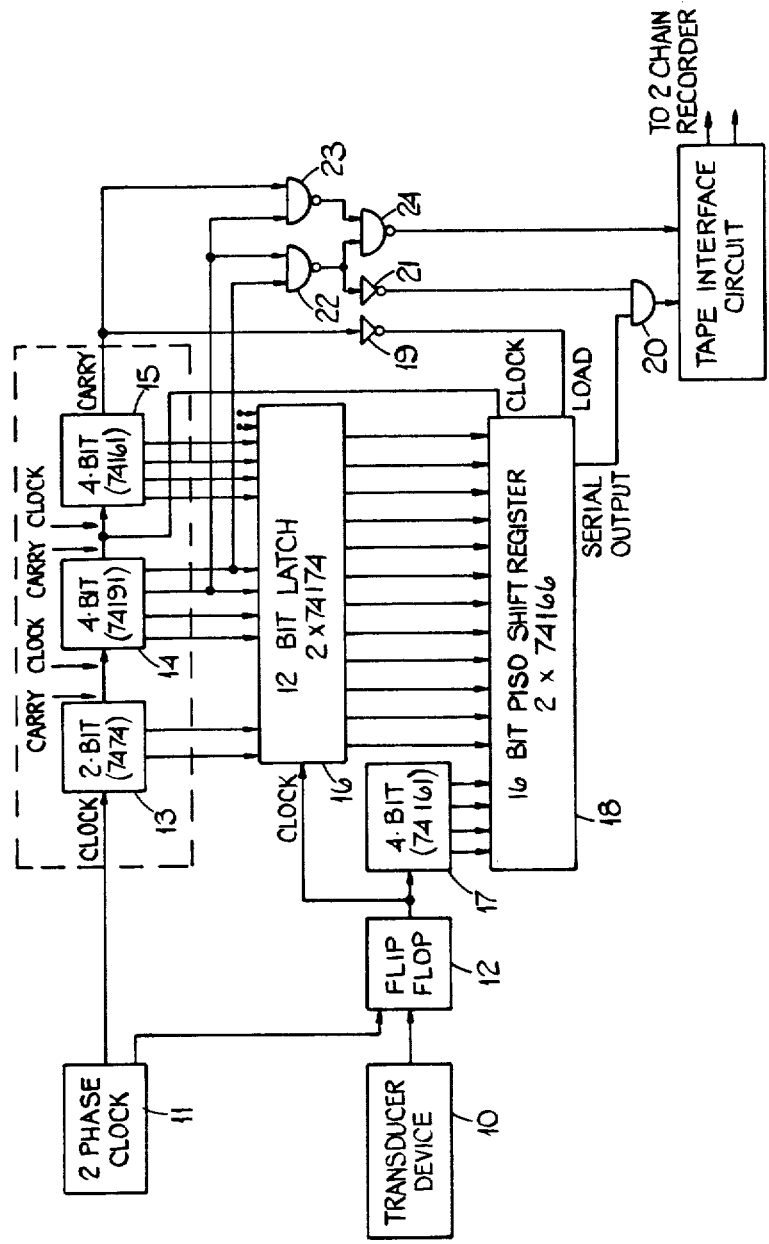

TRANSDUCER CIRCUIT FOR USE IN THE MEASUREMENT OF THE ROTARY SPEED OF A SHAFT OR OTHER ROTARY MEMBER

TECHNICAL FIELD

This invention relates to a transducer circuit for use in the measurement of the rotary speed of a shaft or other rotary member.

BACKGROUND ART

It is conventional for shaft speed measurement purposes to use a transducer device which produces electrical signals at specified angular positions of the shaft. These signals have been used in two ways to obtain digital speed information. In one known procedure the number of signals occurring in a fixed time is counted and in the other known procedure the time between two successive signals is measured by counting the number of pulses produced in that period by a constant frequency clock oscillator.

Both known methods give rise to problems of accuracy of resolution and frequency of sampling. If, for example, it were required to determine the speed within a period of 2.5 mS to an accuracy of 3 rpm when the maximum shaft speed was 3000 rpm the first known method would require a transducer device which emitted 8000 signals per revolution, and the second known method would require a clock frequency 4 MHz (assuming a speed range of 10:1). In the second method there would also be the problem that at the low speed end of the range the "period" count would be very large and at the high speed end the sampling frequency would become unnecessarily high.

It is thus an object of the invention to provide a transducer circuit capable of measuring rotary speed to obtain a desired resolution and sampling period without involving unnecessarily high signals per revolution from the transducer used or unnecessarily high clock frequencies.

SUMMARY OF THE INVENTION

A transducer circuit in accordance with the invention comprises a transducer device which produces electrical signals at specific angular positions of the rotary member, a constant frequency clock oscillator, an n-bit counter connected to count the signals from the transducer device, an m-bit counter connected to count pulses from the clock oscillator, a latch circuit connected to the transducer device and the m-bit counter so as to be loaded with the count state of the m-bit counter each time the transducer device produces one of said signals, and an output circuit connected to the n-bit counter, the latch and the m-bit counter and arranged to be loaded with an n+m bit code from the n-bit counter and the latch each time the m-bit counter overflows, successive n+m bit codes representing the rotary speed of the rotary member at successive instants of overflow of the m-bit counter.

With such an arrangement utilizing a 4-bit counter to count the transducer device signals, and a 10-bit counter to count the clock pulse a resolution of 3 rpm in 3000 rpm and a sampling time of 2.5 mS can be achieved utilizing only 80 signals per revolution and a clock frequency of only 400 KHz.

BRIEF DESCRIPTION OF THE DRAWING

An example of the invention is shown in the accompanying drawing which is a block diagram of the circuit.

BEST MODE OF CARRYING OUT THE INVENTION

The circuit shown in the drawing is intended to be used to produce a 14-bit speed code every 2.5 mS for inputting to a tape recorder for subsequent processing and analysis. It will be appreciated, however, that the speed code could alternatively be processed and displayed on a real-time basis.

The circuit includes a shaft position transducer device 10 which may be of the conventional toothed wheel/variable reluctance pick-up type associated with a suitable pulse squaring circuit to produce a pulse train with pulses commencing at specific angular positions of the shaft. 80 teeth may be used to give the required resolution/sampling period characteristics for the circuit. The circuit also includes a 400 KHz clock oscillator 11 which produces two output pulse trains 180° out of phase as is well known in this art.

One output of the clock oscillator 11 is connected to one input terminal of a flip-flop circuit 12 and the device 10 is connected to another input terminal of circuit 12 so that pulses from the transducer device are strobed so that their transitions do not coincide with other transitions in the circuit.

The other output of the oscillator 11 is connected to the input terminal of a 10-bit counter made up for convenience from a two bit counter 13, and two four-bit counters 14 and 15 in cascade. The stage output terminals of the counters 13, 14, 15 are connected to ten of the input terminals of a 12-bit latch 16 which has its CLOCK input terminal connected to the output terminal of the flip-flop circuit 12. The output terminal of flip-flop circuit 12 is also connected to the CLOCK terminal of a 4-bit counter 17 which thus counts the signals produced by the transducer device 10.

The four bit output of the counter 17 and the 10-bit output of the latch 16 are connected to fourteen of the input terminals of a 16-bit parallel in serial out shift register 18 which has its LOAD terminal connected via an inverter 19 to the CARRY terminal of the counter 15, and its CLOCK terminal connected to the CARRY terminal of the counter 14. The SERIAL OUTPUT of the shift register 18 is connected to one input terminal of an AND gate 20, the other input terminal of which is connected via an inverter 21 to the output terminal of a NAND gate 22 which has its input terminals connected respectively to the two most significant bit stage outputs of the counter 14. Another NAND gate 23 has its input terminals connected to the CARRY output of the counter 15 and to the second most significant bit stage output of the counter 14, and yet another NAND gate 24 has its inputs connected to the output terminals of the NAND gates 22 and 23. The outputs of gates 20 and 24 are connected via a two-channel interfacing circuit to a tape-recorder.

Each transducer device output pulse causes the latch 16 to be loaded with the existing clock pulse count in counter 13, 14, 15. When the counter 13, 14, 15 overflows (i.e. every 2.56 mS) the register 18 is loaded with the 14-bit code currently in the counter 17 (four bits) and the latch 16 (10-bits).

It will be appreciated that this code identifies a pulse from the transducer with a number (from counter 17) and indicates the time at which that pulse occurred (from latch 16). Using two successive codes, the number of pulses from the transducer is indicated by the difference between the two numbers from counter 17 and the time for that number of pulses is indicated by the two readings from latch 16. It will thus be seen that the 14-bit codes represent that speed uniquely and can be used to derive a 10-bit speed code having the required resolution.

In the present case the 14-bit code in the register 18 is clocked out of the register 18 in serial form for recording on one channel of a tape recorder. Clocking of the data from the register 18 is effected during computation of the next 14-bit code by means of the carry pulses from the counter 14, (these occur at a frequency 16 times as great as the carry pulses from counter 15 used to load the register). Gate 20 presents the contents of the register 18 to the recorder in a "return to zero format", the sixteen bits being clocked out during one cycle of the counter 13, 14, 15. If gate 23 were not included, gate 24 would present "return to zero" clock pulses, i.e. the same waveform as would be obtained from gate 20 if register 18 were loaded with logic 1s throughout. Gate 23 inserts an extra pulse to the clock waveform every sixteen pulses and these extra pulses may be used to separate the sixteen bit data blocks on replay. The arrangements used for recovery form no part of the present invention.

I claim:

1. A transducer circuit for use in the measurement of the rotary speed of a rotary member and comprising a transducer device which produces electrical signals at specific angular positions of the rotary member, a constant frequency clock oscillator, an n-bit counter connected to count the signals from the transducer device, an m-bit counter connected to count pulses from the clock oscillator, a latch circuit connected to the transducer device and the m-bit counter so as to be loaded with the count state of the m-bit counter each time the transducer device produces one of said signals, and an output circuit connected to the n-bit counter, the latch and the m-bit counter and arranged to be loaded with an n+m bit code from the n-bit counter and the latch each time the m-bit counter overflows, successive n+m bit codes representing the rotary speed of the rotary member at successive instants of overflow of the m-bit counter.

* * * * *